United States Patent
Rinaldi et al.

Patent Number: 6,150,731
Date of Patent: Nov. 21, 2000

[54] INTEGRATED HIGH FREQUENCY MARINE POWER DISTRIBUTION ARRANGEMENT WITH TRANSFORMERLESS HIGH VOLTAGE VARIABLE SPEED DRIVE

[75] Inventors: Peter M. Rinaldi, Mystic, Conn.; Edgar S. Thaxton, Bradford, R.I.

[73] Assignee: Electric Boat Corporation, Groton, Conn.

[21] Appl. No.: 09/250,758

[22] Filed: Feb. 16, 1999

[51] Int. Cl.[7] .................................................. H02P 9/42
[52] U.S. Cl. ........................... 290/1 A; 290/4 R; 322/58; 322/24
[58] Field of Search .................................. 290/1 R, 1 A, 290/2, 4 R, 4 A; 322/7, 14, 24, 58

[56] References Cited

U.S. PATENT DOCUMENTS

| | | | |
|---|---|---|---|
| 3,558,904 | 1/1971 | Kanngiesser | 307/82 |
| 3,768,002 | 10/1973 | Drexler et al. | 322/25 |
| 3,930,175 | 12/1975 | Chirgwin | 310/160 |
| 4,058,759 | 11/1977 | Halfhill | 322/13 |
| 4,114,555 | 9/1978 | O'Brien, Jr. | 115/76 |
| 4,661,714 | 4/1987 | Satterthwaite et al. | 290/4 R |
| 4,743,828 | 5/1988 | Jahns et al. | 318/810 |
| 4,780,659 | 10/1988 | Bansal et al. | 322/58 |
| 5,199,912 | 4/1993 | Dade et al. | 440/6 |
| 5,270,913 | 12/1993 | Limpaecher | 363/140 |
| 5,625,276 | 4/1997 | Scott et al. | 322/24 |
| 5,684,690 | 11/1997 | Levedahl | 363/178 |

*Primary Examiner*—Nicholas Ponomarenko
*Attorney, Agent, or Firm*—BakerBotts, LLP

[57] ABSTRACT

A marine power distribution arrangement utilizes generators driven at standard or higher than normal speeds and/or having a number of poles to produce electric power at a standard 50/60 Hz frequency or substantially higher than the standard 50/60 Hz frequency, such as 400 Hz. Each generator is a multi-phase, multi-circuit generator supplying isolated outputs on a plurality of lines to a propulsion power converter having isolated inputs to provide variable frequency, variable voltage power to a ship propulsion motor and to a service power converter to provide ship service power at a standard AC frequency or DC and at standard voltage for a service load. With this arrangement, power conversion transformers can, for the most part, be eliminated, thereby reducing the size and weight of the distribution system.

5 Claims, 2 Drawing Sheets

INTEGRATED HIGH FREQUENCY MARINE POWER DISTRIBUTION ARRANGEMENT WITH TRANSFORMERLESS HIGH VOLTAGE VARIABLE SPEED DRIVE

BACKGROUND OF INVENTION

This invention relates to marine power distribution systems for supplying drive power of variable frequency and variable voltage for a ship propulsion motor as well as fixed frequency standard voltage power for ship service loads.

Conventional integrated marine electric drive systems generate AC power at 60 Hz and either utilize the AC power directly at 60 Hz, through frequency converters for ship's propulsion motors and transformers for ship's auxiliary power circuits, or rectify the AC power from the generator and distribute direct current (DC) power and then convert the DC power to AC power using conversion equipment for the ship's propulsion motors and also for the ship's auxiliary loads.

The commercial industry as well as the military has many years of experience generating and distributing power at 50/60 Hz. Conventional 50/60 Hz generators operate at speeds of 1200 rpm up to 3600 rpm. This is shown below and in Table 1.

Frequency:

$$f = \frac{(rpm \cdot poles)}{120}$$

TABLE 1

Limitation of 50/60 Hz Generators

| rpm | Number of Poles | Frequency |
| --- | --- | --- |
| 3600/3000 | 2 | 60/50 |
| 1800/1500 | 4 | 60/50 |
| 1200/1000 | 6 | 60/50 |

The size and weight of a generator are inversely related to the generator speed and the generator pole number in the following manner; Size 1/(rpm·poles) and Weight 1/(rpm·poles). Consequently, Size and Weight 1/(rpm·poles). Therefore, to provide a higher power density, resulting in a reduction of size and weight for a given power level, a higher generator frequency (>60 Hz) must be provided by using a higher generator speed (>3600 rpm) and/or a higher pole number (>2).

The use of a higher frequency to increase power density has been employed successfully by 400 Hz distribution systems in the aircraft industry. However, no such application has been shown to be feasible in conjunction with 60 Hz (or other AC or DC power) for both service power and vehicle propulsion in marine vessels. Since higher power density is important for marine applications, a generator for such applications should produce high frequency power as a result of either an increased generator speed, a higher pole number (>2) or a combination of both.

Transformer power density, i.e. size or weight per unit power, is affected by many variables. The main variables which will influence size and weight are: (1) specified sound level requirements (both airborne and structureborne); (2) operating electrical frequency; (3) operating voltage; (4) voltage impulse and dielectric levels; (5) phase shifting requirements; (6) efficiency; (7) type and configuration of cooling system (air, water, forced); and (8) winding configurations, e.g. arrangement of multiple windings. As the required power levels increase the motor drive input transformer weights make up a larger percentage of the overall system weight. Studies have shown that transformers have an average power density of 3.5 lbs/hp for large-scale motor power conversion equipment. However, depending on system requirements, the transformer power density has been estimated in the range of 2.3 lbs/hp to 5.6 lbs/hp. Normally, to achieve the best power densities in the range of 2 lbs/hp, higher operating frequencies and forced cooling of some type must be used. When supplying ships with shaft horsepower from 25,000 shp to 100,000 shp or higher the transformer weight becomes significant. Table 2 provides an indication of transformer weights at various shaft horsepower levels and power densities.

TABLE 2

Transformer Weight versus Shaft Horsepower

| Shaft Horsepower Level | Transformer Weight (lbs) (Power Density 2.3 lbs/hp) | Transformer Weight (lbs) (Power Density 5.6 lbs/hp) |
| --- | --- | --- |
| 25,000 | 57,500 | 140,000 |
| 50,000 | 115,000 | 280,000 |
| 80,000 | 184,000 | 448,000 |
| 100,000 | 230,000 | 560,000 |

In the Satterthwaite et al. U.S. Pat. No. 4,661,714, an electric marine propulsion system includes two diesel engines connected to drive corresponding alternators at a speed which is two or three times the normal operating speed of the alternators, thereby producing power at a frequency two or three times the standard 60 Hz frequency, i.e. from 120 Hz to up to 180 Hz. The generator outputs are supplied through a ship service switchboard to a series of frequency converters which supply ship propulsion motors with power at frequencies which may vary from 0 to 60 Hz. In addition, the switchboard supplies high frequency power to a transformer and frequency converter for the ship's service utility and auxiliary power at standard 60 Hz frequency.

The Levedahl et al. U.S. Pat. No. 5,684,690 discloses an electric power supply system for propulsion and service control in which each engine turbine drives both a service alternator and a separate propulsion alternator.

The patent to Limpaecher, U.S. Pat. No. 5,270,913, relates to a transformerless semiconductor power conversion system in which a series of H-bridges are used to convert AC power to high voltage DC power. Similarly, the Bansal et al. U.S. Pat. No. 4,780,569 uses H-bridge rectifiers receiving power from a plurality of AC generators with phase-shifted output windings supplying AC power to isolated H-bridge rectifier arrangements to produce a high voltage DC output, while the patent to O'Brien, Jr., U.S. Pat. No. 4,114,555, discloses a power supply for a marine vessel in which a plurality of diesel motor-AC generator units are connected in parallel to provide AC power that is rectified and voltage-controlled by a plurality of SCRs supplying DC motors, thereby avoiding the use of transformers in a propulsion motor power supply.

In integrated electric plants of the prior art, limitations of frequency, voltage, and generator arrangement are presented. Such limited integrated electric power distribution systems have certain disadvantages with respect to power density, i.e. size and weight.

SUMMARY OF THE INVENTION

Accordingly, it is an object of the present invention to provide an integrated high frequency marine power distribution arrangement with a transformerless high voltage variable speed drive which overcomes disadvantages of the prior art.

Another object of the invention is to provide an integrated standard (60 Hz) or higher (>60 Hz) frequency marine power distribution arrangement having reduced space and weight requirements.

These and other objects of the invention are attained by providing a marine power distribution system containing a multi-phase, multi-circuit power generator which supplies power through a plurality of isolated output circuits to two arrays of modular multi-level, multi-phase, multi-circuit power conversion units for supplying propulsion power at a variable frequency and voltage, and service load power at a standard frequency and voltage including DC voltage.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
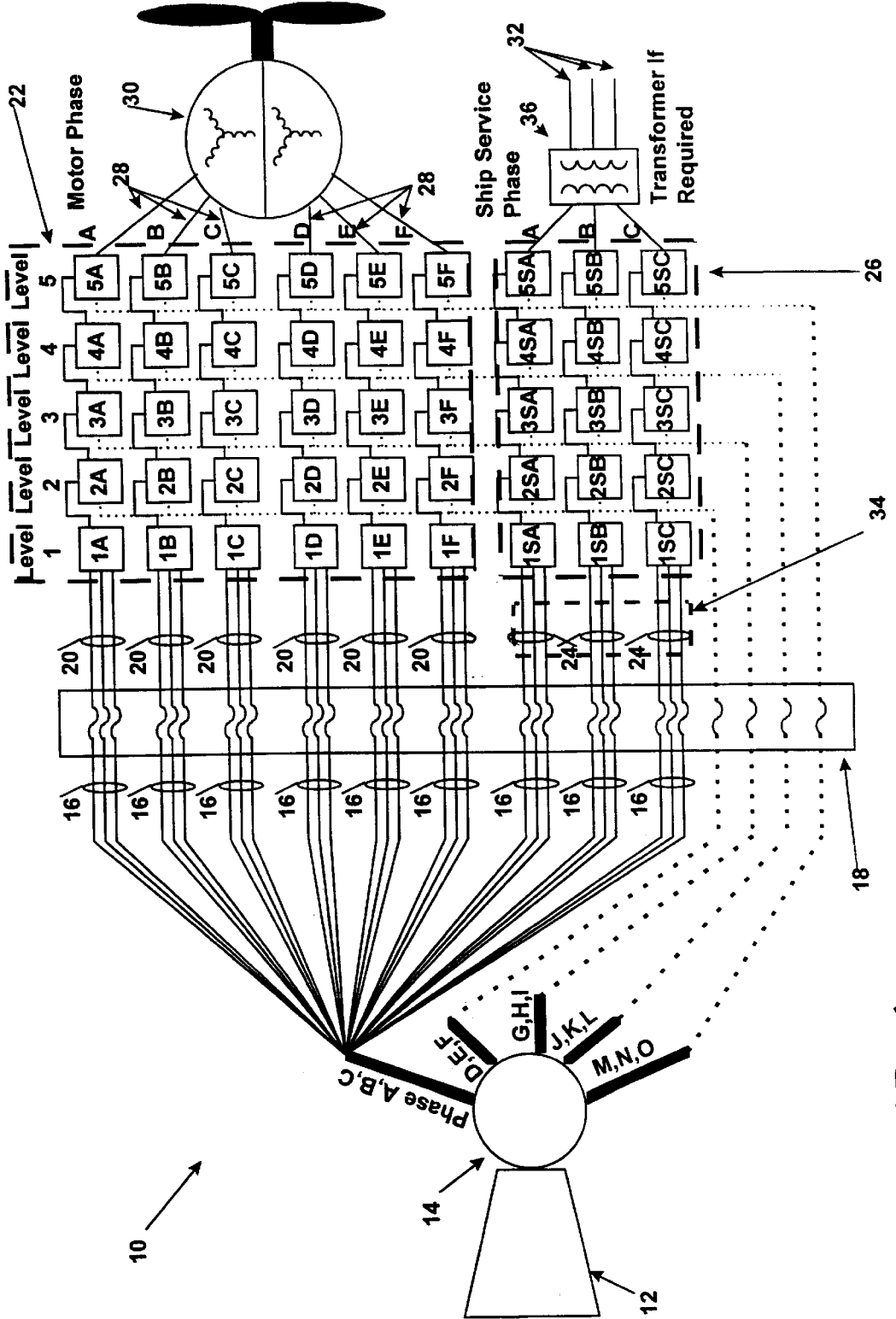
FIG. 1 is a schematic block diagram illustrating a representative embodiment of an integrated high frequency marine power distribution system in accordance with the invention providing power to a propulsion motor and to service loads from a single turbine and high frequency generator.

Conventional marine propulsion motor power converters must be able to provide variable voltage and variable frequency power to a ship propulsion motor to control the motor speed. However, service loads for a ship typically require power at a fixed voltage and frequency, usually 120 volts AC or 480 volts AC at 50/60 Hz. Where power is generated at a frequency above 60 Hz such as 400 Hz, the service power converter must convert the high frequency input power to the required fixed frequency power and the propulsion motor power converter must convert the high frequency input power to a variable voltage and variable frequency power.

Isolated AC input power sources for such converters are normally derived from one or more transformers. The size and weight of a motor drive input transformer for such applications is substantial and can amount to 50% or more of the total motor drive size and weight. As an example, a small size marine propulsion motor in the range of 25,000 shaft horsepower receives power from two motor drives and power conversion equipment rated for approximately 10 MW each. As shown in Table 2 above, the necessary transformers for this drive can weigh as much as 140,000 pounds total. Techniques such as transformer liquid cooling, modular transformer configurations and higher frequency distribution can reduce transformer size and weight but transformer weight is still a significant portion of the total motor drive weight. Motor drive size and weight are important aspects for marine applications because of the necessary limitations in size and arrangement of the components.

A preferred embodiment of the invention includes a multi-phase, multi-circuit generator, and two arrays of multi-level, multi-phase, multi-circuit power conversion equipment. The power conversion equipment arrays receive power from isolated 3-phase electrical input sources of either standard (60 Hz) or non-standard (>60 Hz) power system frequencies, and may be configured in parallel and in series configurations to increase the output power and voltage levels in addition to providing multi-phase outputs. One array provides power to the propulsion motor and the other provides power to the ship service loads.

Input electrical isolation for the power conversion modules is provided by the generator itself. For example, for a particular 10 MW (12,000 HP) motor drive configuration requiring thirty isolated three-phase power supplies, instead of using a specialized phase shifting, multi-pulse, transformer with multiple secondaries, thirty 3-phase circuits which are taken directly from the generator can accomplish the necessary isolation of the drive power module inputs. The thirty 3-phase sets (90 wires) can be derived from 6, 9, 12, 15, 18 etc., generator phases, depending on the required system power quality requirements. The number of circuits will also increase with the requirement to supply ship service power conversion equipment.

Because solid state power conversion requires rectification (the above-referenced power module loads are 3-phase, 6-pulse rectifiers) power quality, i.e. the presence of harmonics, becomes an issue. If a 30 pulse system were required to reduce harmonic content caused by the individual 6-pulse 3-phase power module rectification process, a 15 phase generator would be necessary. The output of the generator in this case would provide 6 outputs from each 3-phase group. Therefore, the number of isolated 3-phase circuits required at the generator output terminals ('circuits in hand') is based on the number of motor drive power modules and the phase number is based on system requirements regarding harmonics, i.e. power quality, given that the power module loads are 3-phase, 6-pulse, rectifiers.

Complexity is added to the generator arrangement for an increased phase number and to directly wire out multiple isolated circuits to the generator connection enclosure. For example, a 16 MW, 15 phase, low voltage (600 vac) multi-circuit generator would require approximately 60% more volume in the generator than a similar 16 MW, 3 phase medium voltage (13.8 kV) generator in order to make the large number of necessary connections. Studies on multi-phase generators have indicated that the weight of the multi-phase machines does not increase significantly. However, a 10 MW propulsion motor drive input transformer could weigh a minimum of 27,500 lbs when operated at higher distribution frequencies and provided with innovative cooling designs. Using the standard cooling methods, i.e. air cooling, and distribution frequencies (60 Hz) can easily double the transformer weight, i.e. to approximately 55,000 lbs.

In the typical integrated marine power distribution arrangement 10 shown in FIG. 1, a turbine 12 drives a standard or high frequency >60 Hz generator 14 arranged to provide output power on thirty electrically isolated 3-phase circuits 16, each of which has a relatively low voltage, for example 600 VAC, and each of which is electrically isolated from the others. The 3-phase circuits 16 from the generator are connected to corresponding power modules 1A–5F in a motor drive power converter 22 through electrical protection devices (fuses or circuit breakers) mounted in switchgear 18 and isolated 3-phase cable groups 20. In this example the motor drive power converter 22 is configured to provide a 4,160 volt, medium voltage output for the motor drive. Other configurations of motor drive power modules can be provided.

In the illustrated arrangement 10, three further separate circuits 24 are provided from each phase group to supply power modules 1SA–5SC in a ship service power converter 26. Supplying power to ship service from each phase group effectively balances the generator loading among the phases. The ship service power converter output is variable in voltage, frequency and power as required to supply ship service loads. One or more of various ship service distribution voltages, e.g. 4,160 VAC, 450 VAC, and DC are supplied depending on platform requirements. An input transformer 34 or output transformer 36 may be included if required for the ship service power converter depending on final ship service load needs. Since ship service electrical loads are normally only a small percentage, approximately 10% or less, of the total ship power generation, overall system power density will not be impacted significantly by the use of such transformers.

Each of the power converters 22 and 26 may be of the type disclosed in the copending application of Duba et al. Ser. No. 09/046,076, filed Mar. 23, 1998, the disclosure of which is incorporated herein by reference, to which isolated AC input power is required for each of the inputs. Additionally, the topology or electrical configuration of the motor drive power modules allows many configurations of generator phase and circuit numbers to be derived. Although the embodiments are described herein in terms of specific phase and circuit numbers the invention may be applied to other multi-circuit, multi-phase transformerless power conversion configurations, as well.

To provide the required number of isolated inputs to a modular multi-circuit power converter, the generator 14 is configured as a multi-phase, multi-circuit machine. Alternatively, the generator may be configured with any number of circuits and phases dependent on power module topologies and configurations. Table 3 illustrates examples of possible medium voltage PWM motor drive configurations based on a typical 315 kW power module. Other configurations are also possible.

TABLE 3

Generator/Drive Phase Circuit Configuration

| Generator Phases | 5 Level, 4,160 VAC, 12,500 HP, 6-Phase Drive Circuits per Phase | 4 Level, 3,300 VAC, 10,000 HP, 6-Phase Drive Circuits per Phase | 3 Level, 2,400 VAC, 7,600 HP, 6-Phase Drive Circuits per Phase | 5 Level, 4,160 VAC, 25,000 HP, 6-Phase Drive Circuits per Phase |
|---|---|---|---|---|
| 9 | — | — | 6 | — |
| 12 | — | 6 | — | — |
| 15 | 6 | — | — | 6 |

It should be noted that the drive topology allows interphase transformer connection at the midpoint nodes of two pairs of semiconductors in each power module H-bridge, i.e., parallel module operation, effectively doubling the power level of an isolated circuit.

The phases and circuits of the generator 14 must be insulated from each other (phase to phase, phase to circuit, and circuit to circuit) for up to twice the drive output voltage (line to neutral) plus 1,000 volts. The number of circuits in the generator 14 is preferably a multiple of three to balance the magnetic fields in the generator.

The generator output voltage of each 3-phase set should be a relatively low voltage (~600 VAC) for compatibility with the power converters 22 and 26 which utilize commercially available semiconductors having a withstand voltage in the range of 1,200 to 1,700 volts.

Figure 2:
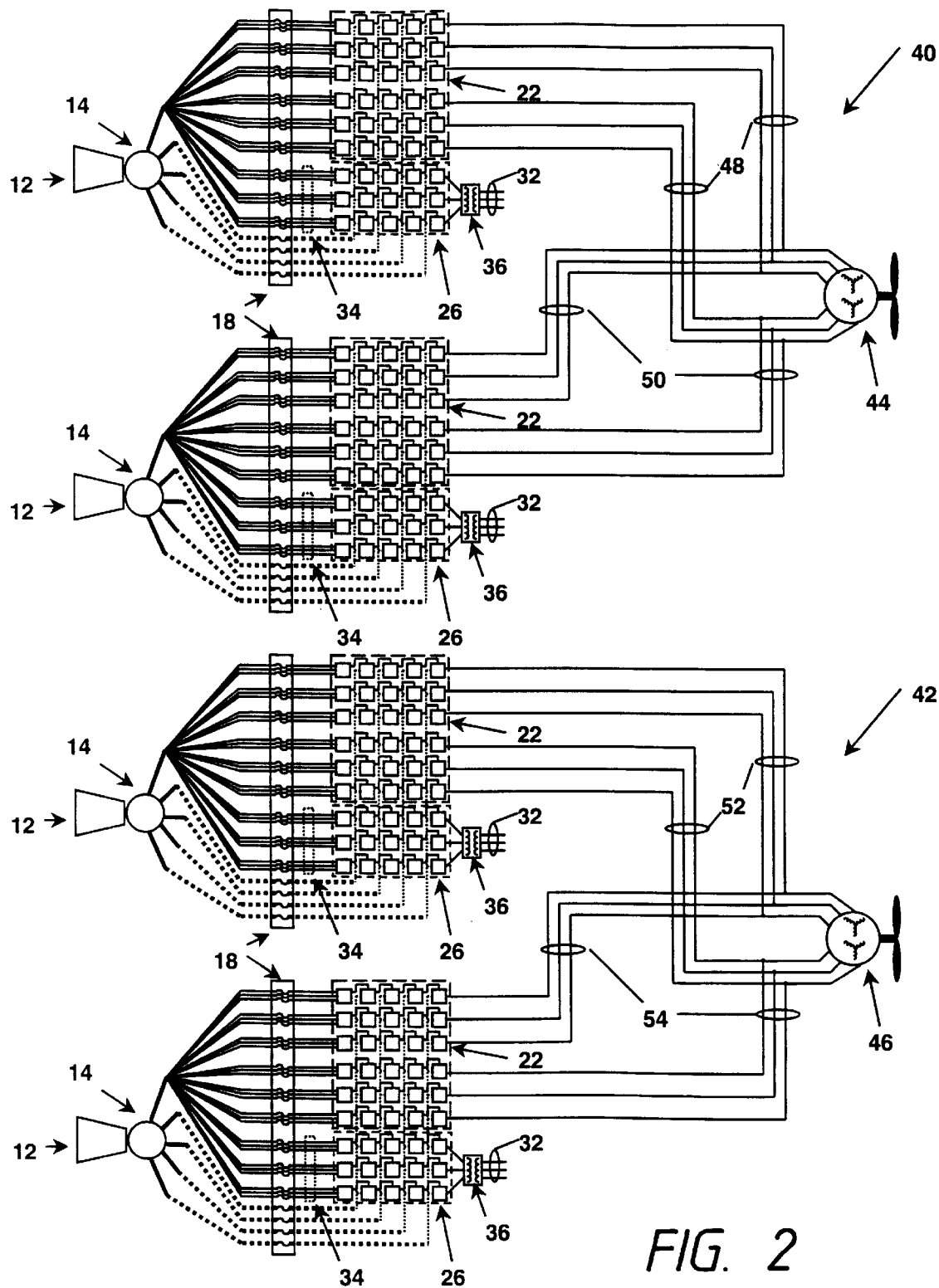
FIG. 2 is a schematic block diagram illustrating another embodiment of the invention having two separate electric plants with two turbines each driving corresponding high frequency generators to supply power to two propulsion motors as well as to ship service loads.

FIG. 2 is a schematic illustration of a typical marine application of the invention utilizing two electric plants 40 and 42 for driving corresponding propulsion motors 44 and 46, respectively, each of the propulsion motors being supplied with power from two power supply arrangements of the type described above with reference to FIG. 1. Thus, the propulsion motor 44 is connected to receive power from two power supply arrangements 48 and 50 and the propulsion motor 46 is connected to receive power from two power supply arrangements 52 and 54.

Inasmuch as the high frequency generators 14 produce a relatively low voltage output of approximately 600 volts AC with correspondingly high currents, system protection is necessary in addition to the isolated generator feeds to the motor drive circuits. However, the multi-phase, multi-circuit generator has the advantage of limiting fault currents because of the many isolated circuit windings. For example, a propulsion generator rated 12 MW at 600 VAC (0.9 pf) with five phase groups and six isolated three-phase circuits per phase group will have a full load current in one feed circuit of 428 amps continuous and 2,850 amps of available symmetrical fault currents if a subtransient reactance of 15% is assumed. Any of several circuit interruption options may be used for protection in such circuits, such as fuses, air (AQB) circuit breakers, solid state interrupters, and controllable SCR-based rectifiers in the generator output circuits to provide a DC distribution system. Circuit protection in the latter arrangement would require removal of the rectifiers in each motor drive power module and this would also require that the generator maintain symmetrical power delivery over all operating profiles and it would be necessary to avoid imposing electrical imbalances in the generator as a result of motor drive faults.

If desired, service voltages and frequencies other than the standard service voltage range of 120 to 480 volts AC and 50/60 Hz can be provided and DC service loads can be accommodated using only a transformer (if necessary) and rectifier stage. In addition, power supplies of the type described herein can be utilized as separate point-of-need power supplies, each located in close proximity to a particular load requiring its use, thereby eliminating voltage drop problems on platforms with loads that require high frequency power. Moreover, backup DC power can be provided in the event of a failure of the main power generator, for example, by onboard batteries connected directly to the power conversion modules.

Although the invention has been described herein with reference to specific embodiments, many modifications and variations therein will readily occur to those skilled in the art. Accordingly, all such variations and modifications are included within the intended scope of the invention.

We claim:

1. A marine power distribution arrangement comprising:
   a generator for generating a plurality of standard (50/60 Hz) to higher (>60 Hz) frequency AC phases at a plurality of isolated low voltage outputs;
   a motive power source for driving the generator;
   a plurality of electrical lines, each transmitting power from one of the plurality of isolated low voltage outputs of the generator;
   a propulsion power converter connected to receive power directly from the isolated low voltage outputs of the generator and to provide a variable voltage, variable frequency output having a voltage higher than that of the low voltage outputs; and, a marine propulsion motor connected to receive the variable voltage, variable frequency output from the power converter.

2. A marine power distribution arrangement according to claim 1 including a ship service power converter receiving power from the plurality of isolated generator outputs and providing ship service power at a selected voltage and frequency.

3. A marine power distribution arrangement according to claim 2 including switchgear for connecting the isolated generator outputs to both the propulsion power converter and the ship service power converter.

4. A marine power distribution arrangement according to claim 3 wherein the switchgear includes protection circuits.

5. A marine power distribution arrangement according to claim 3 including an isolation transformer electrically connected between the ship service power converter and the isolated generator outputs.

\* \* \* \* \*

UNITED STATES PATENT AND TRADEMARK OFFICE
CERTIFICATE OF CORRECTION

PATENT NO.   : 6,150,731
DATED        : November 21, 2000
INVENTOR(S)  : Rinaldi et al.

It is certified that error appears in the above-identified patent and that said Letters Patent is hereby corrected as shown below:

Column 1,
Line 43, "Size 1/(rpm·poles)" should read -- Size $\alpha$ 1/(rpm·poles) --; and "Weight 1/" should read -- Weight $\alpha$ 1/ --
Line 44, "Weight 1/(rpm·poles)" should read -- Weight $\alpha$ 1/(rpm·poles) --

Column 4,
Lines 38, "(600 vac)" should read -- (600 VAC) --

Signed and Sealed this

Twenty-fifth Day of December, 2001

Attest:

Attesting Officer

JAMES E. ROGAN
Director of the United States Patent and Trademark Office